United States Patent [19]

Palma et al.

[11] Patent Number: 5,196,749
[45] Date of Patent: Mar. 23, 1993

[54] STATOR SUPPORT AND POSITIONING STRUCTURE FOR A DYNAMOELECTRIC MACHINE

[75] Inventors: Rodolfo Palma, Troy; John J. Cestra, Delanson, both of N.Y.

[73] Assignee: REM Technologies, Inc., Schenectady, N.Y.

[21] Appl. No.: 763,632

[22] Filed: Sep. 23, 1991

[51] Int. Cl.$^5$ .............................................. H02K 1/06
[52] U.S. Cl. ...................................... 310/217; 310/64; 310/91
[58] Field of Search ............... 310/217, 216, 166, 168, 310/179, 91, 64, 65

[56] References Cited

U.S. PATENT DOCUMENTS

| | | | |
|---|---|---|---|
| 437,501 | 9/1890 | Mordey . | |
| 2,519,097 | 8/1950 | Allen | 171/252 |
| 3,321,652 | 12/1963 | Opel | 310/168 |
| 3,588,559 | 6/1971 | Fono | 310/168 |
| 3,912,958 | 10/1975 | Steen . | |
| 3,944,863 | 3/1976 | Apsit et al. | 310/168 |
| 4,134,054 | 1/1979 | Akamatsu | 318/685 |
| 4,218,645 | 8/1980 | Kirsch et al. | 322/47 |
| 4,639,626 | 1/1987 | McGee | 310/155 |
| 4,659,953 | 4/1987 | Luneau | 310/111 |
| 4,670,696 | 6/1987 | Byrne et al. | 318/701 |
| 4,786,834 | 11/1988 | Grant et al. | 310/194 |
| 4,864,176 | 9/1989 | Miller et al. | 310/194 |
| 4,954,737 | 9/1990 | Guichard | 310/168 |
| 5,053,663 | 10/1991 | Boer et al. | 310/91 |
| 5,066,748 | 4/1991 | Wintermute | 310/258 |

*Primary Examiner*—Steven L. Stephan
*Assistant Examiner*—Matthew Nguyen
*Attorney, Agent, or Firm*—Heslin & Rothenberg

[57] ABSTRACT

A support and positioning structure for a stator assembly of an inductor type dynamoelectric machine is disclosed. The stator assembly includes a plurality of stationary C-shaped armature elements circumferentially located about a central longitudinal axis and supported by end portions. The C-shaped armature elements include armature windings on a base portion extending parallel to the longitudinal axis and legs extending from each end in a radially inward direction. The support structure includes a nonmagnetic ring shaped member sized to be insertable over the bases of the circumferentially spaced C-shaped armature elements. The bases are in contact with an inner portion of the ring shaped member to thereby position the C-shaped armature elements. The ring shaped member may provide improved cooling effects if made of a heat conductive material and may allow air gap tolerances within the stator assembly to be minimized.

25 Claims, 10 Drawing Sheets fig. 4 fig. 2 fig. 3A fig. 3B fig. 3C fig. 5 fig. 6A fig. 6B fig. 6C fig. 7A fig. 7B fig. 7C fig. 8A fig. 8B fig. 8C fig. 10 fig. 12 fig. 13 fig. 11

STATOR SUPPORT AND POSITIONING STRUCTURE FOR A DYNAMOELECTRIC MACHINE

BACKGROUND OF THE INVENTION

1. Field of the Invention

This invention relates to inductor type dynamoelectric machines, e.g., motors, generators and, more specifically, to a support and positioning structure for a stator assembly thereof.

2. Background Art

Dynamoelectric machines are commonly used as motors for converting electrical to mechanical energy. Inductor type dynamoelectric motors may be used as adjustable speed drives for high speed operation. However, such dynamoelectric machines may also be used for electrical generation by mechanically driving the rotor by an external source thereby generating electrical energy in the armature windings. Such dynamoelectric machines are generally characterized by a stator which includes both AC armature and DC exitation coils surrounding a coilless rotor. In this type of dynamoelectric machine, there are no rotating field winding or armature coils, slip rings, brushes and associated connections which are common to machines having rotating windings. Since dynamoelectric machines contain fewer rotating parts they have a more solid rotor construction and are particularly suitable for high speed application. One version of such an inductor type dynamoelectric machine, employs a circumferentially distributed arrangement of C-shaped armature elements surrounding a generally cylindrical field coil which in turn encloses a transverse pole magnetic rotor. U.S. Pat. Nos. 437,501 and 2,519,097 and 3,912,958 describe earlier machines of this type of design.

A more recent version of such an inductor type machine is disclosed in commonly owned U.S. Pat. No. 4,786,834 and No. 4,864,176. A spool-like support structure supporting field windings and armature elements is disclosed therein. The spool-like structure is made of a nonmagnetic material and has a hollow, elongated central portion extending concentrically about a longitudinal axis. This central portion supports a field coil and defines an interior longitudinal passageway for accommodating a coaxial rotor inserted therethrough. End portions are located at each end of the central portion and extend radially outward therefrom. Each of the end portions is preferably provided with radially oriented grooves in its axially outermost surface. The grooves are configured to receive and orient legs of generally C-shaped armature coil elements arranged in a circumferentially distributed pattern about the periphery of the spool-like structure. The end portions of the spool-like structure are axially spaced and radially dimensioned and the grooves in the outer face of each portion are angularly spaced so as to precisely position the armature elements in three orthogonal directions. The spool-like structure is also provided with ports within which cooling fluid is pumped by the rotor.

A stator mounting arrangement is disclosed in U.S. Pat. No. 5,006,748 which teaches the use of mounting supports which are affixed to the dynamoelectric machine housing. The end portions of the stator assembly are fastened to the mounting supports thereby mounting the stator assembly within the housing.

Other features, advantages and benefits of these dynamoelectric machines, including the stator support structures thereof, are described in detail in U.S. Pat. Nos. 4,786,834; 4,864,176 and 5,006,748. Each of these patents is incorporated herein by reference and made a part of this disclosure.

Particularly in high power, high rotation dynamoelectric machines, use of the spool-like stator support structures has not significantly reduced thermal resistance and minimized losses in armature flux leakage. Also, with such high speed operation, additional support for the stator assembly may be desireable, particularly at the radially outer portions of the C-shaped armature elements. It is therefore desirable to provide a mechanical support for the stator assembly which may be mounted externally to C-core elements to maintain the structural integrity of the stator assembly, particularly at the radially outer portion of the armature elements.

It is also desireable to provide a support structure which will allow air gap tolerances within the machine to be reduced and, reduce thermal resistance within the machine thereby improving its efficiency and performance. Moreover, it is also desirable to minimize eddy losses and armature flux leakage within these dynamoelectric machines.

It is therefore an object of the present invention to provide support for the stator package making it a self-standing structure.

It is also an object of the present invention to provide structural means to attach the stator package to the machine frame.

It is also an object of the present invention to simplify and facilitate the motor assembly and construction.

It is also an object of the present invention to reduce stator and motor vibration levels, by providing a stiffer stator package.

It is also an object of the present invention to provide a low thermal impedance path for the machine heat, hence facilitating external cooling, and reducing hot spots inside of the machine.

It is also an object of the present invention to provide additional cooling means close to the machine core, if a cooling fluid is circulated inside the supporting ring.

It is also an object of the present invention to provide self-centering of the stator and rotor members, allowing close tolerances for the airgap.

It is also an object of the present invention to control and reduce armature leakage fluxes, maintaining stray losses low.

SUMMARY OF THE INVENTION

The aforementioned objects are achieved, and additional benefits are realized, by providing an external support structure useable in the inductor type rotating dynamoelectric machine in accordance with the principles of the present invention.

The present invention incorporates a support and positioning structure for a stator assembly of an inductor type dynamoelectric machine. The stator assembly includes a plurality of stationary C-shaped armature elements circumferentially located about a central longitudinal axis and supported by end portions of an internal spool-like support. Each C-shaped armature element includes an armature winding on a base portion with a leg extending from each end of said base portion in a radially inward direction. The support structure, in accordance with the present invention, includes a nonmagnetic ring shaped member sized to be insertable over the bases of the circumferentially spaced C-shaped armature elements wherein the bases are in contact with an inner portion of the ring shaped member to position the C-shaped armature elements. The ring shaped support member may be press fit onto the bases of the circumferentially spaced C-shaped armature elements.

The ring shaped member may have a plurality of recesses axially oriented and circumferentially spaced within the ring shaped member. The individual recesses may be sized to receive the base of one of the C-shaped armature elements whereby the bases of the C-shaped armature elements are insertable axially into corresponding recesses within the ring shaped member. The surface at the outer diameter of the ring shaped member may be in heat conducting relationship with the outer frame of the dynamoelectric machine to provide increased cooling. The ring shaped member may also comprise a passage, capable of receiving a heat conductive fluid therein, running circumferentially within the ring shaped member. The ring shaped member may comprise an L-shaped cross-section having a long leg portion and a short leg portion. The ring shaped member may be in contact with an end portion of the spool-like support of the stator assembly and may be fastened thereto by a fastening means.

The support and positioning structure may also include a configuration wherein the ring shaped member is integral to an end wall of an outer frame of the dynamoelectric machine. The ring shaped member may have a tapered inner diameter surface, the tapered surface being complimentary to a taper of the C-shaped armature elements. The ring shaped may also have a tapered outer diameter surface, the tapered outer diameter surface being complimentary to a taper of the outer surface.

BRIEF DESCRIPTION OF THE DRAWINGS

These and other features of the present invention will be more readily understood from the following detailed description, when considered in conjunction with the accompanying drawings in which.

DETAILED DESCRIPTION

Figure 1:
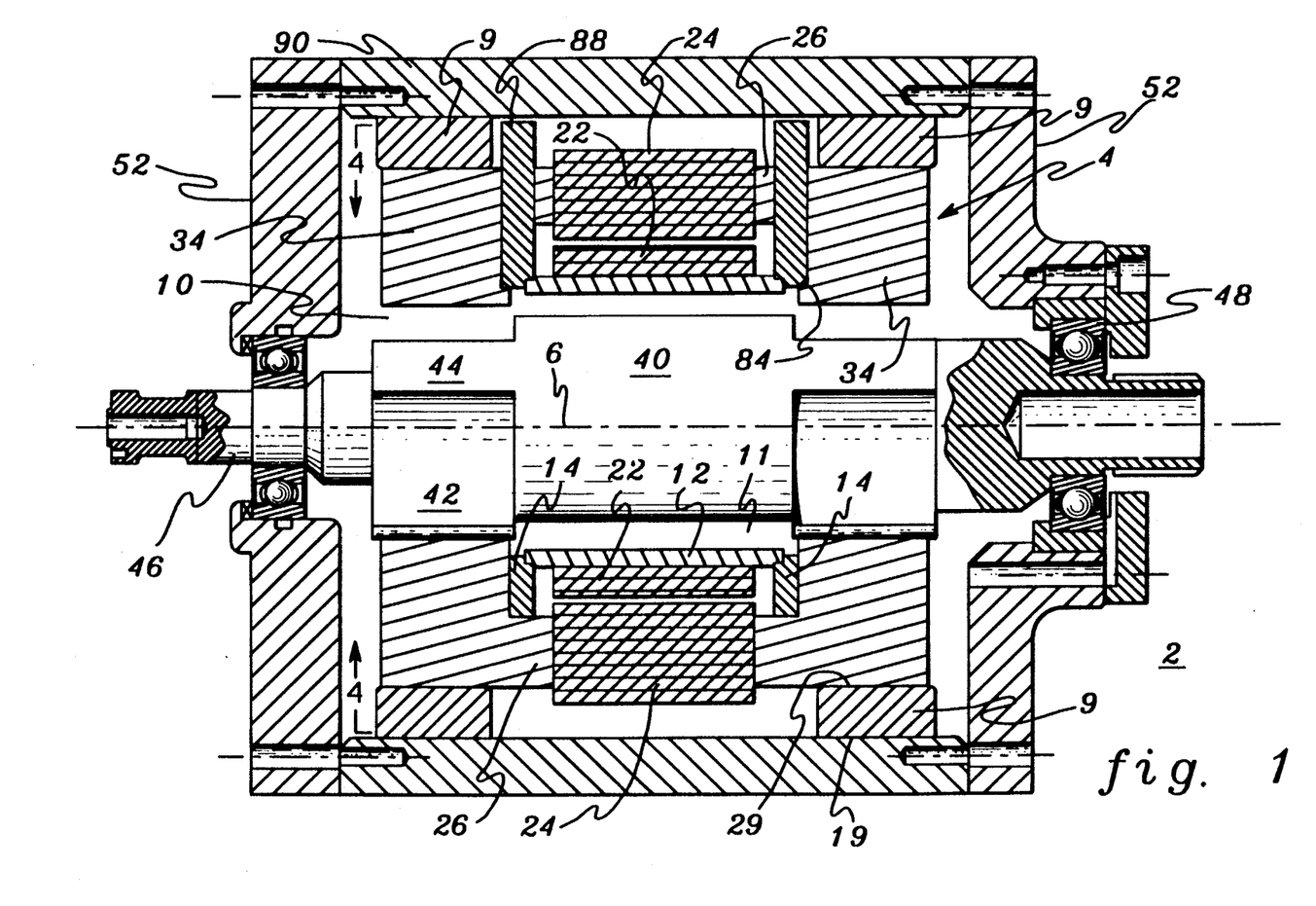
FIG. 1 is a cross sectional view from the side of an inductor type dynamoelectric machine including a stator assembly having one embodiment of a support and positioning structure in accordance with the principles of the present invention.

Referring to FIG. 1, an inductor type rotating dynamoelectric machine having a stator support and positioning structure constructed in accordance with the principles of the present invention is shown. The machine generally denoted 2 includes a stationary stator assembly 4 surrounding a rotatable coil-less rotor 40, a ring shaped member 9 and a housing 90.

References to directions herein, such as axial, radial and parallel, etc. are intended to be referenced from a central longitudinal axis 6. A transverse pole magnetic rotor 40 extends along and is coaxial with the longitudinal axis 6. The rotor is preferably made of a solid one piece construction and is supported by bearings 48 located within the end walls 52 of a housing 90. Rotor 40 is provided with circumferentially spaced, axially extending surface recesses or cutouts 42 at the ends thereof, which define a desired number of lobes 44 at each end of the rotor, in a manner well known in the art. The rotor may be constructed of any available magnetic material such as carbon steel. Also, the rotor 40 may be constructed as disclosed in U.S. Pat. No. 5,001,378, assigned to the assignee of the present invention and incorporated herein by reference.

Figure 2:
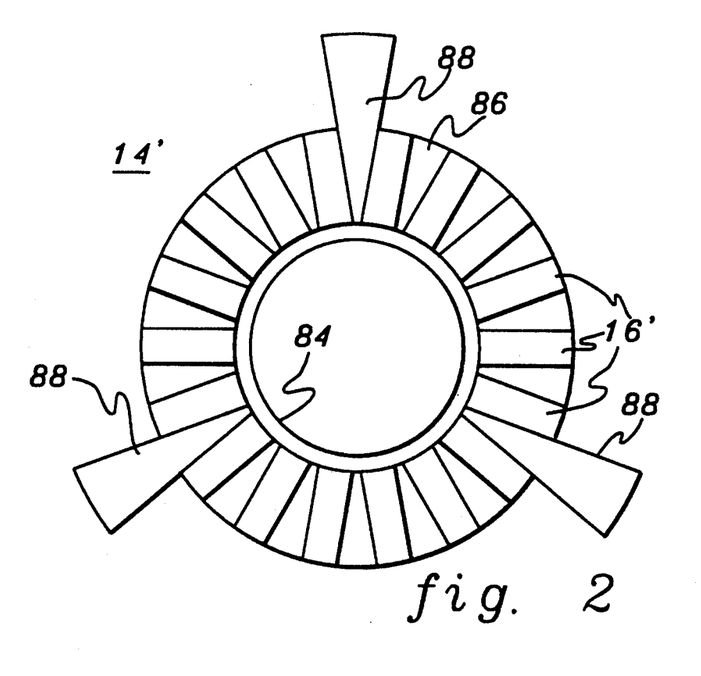
FIG. 2 is a cross sectional end view of an end portion of a stator assembly used within the dynamoelectric machine depicted in FIG. 1.

The stator assembly 4 includes an internal spool-like support structure 11. The spool-like structure has a central, generally cylindrical portion 12 which is coaxial with the central longitudinal axis 6 and defines an interior, longitudinally extending central passageway 10 for receiving rotor 40. Stator support structure 11 also includes a pair of end portions 14. The end portions, one of which is shown in detail in FIG. 2, are generally disc shaped structures having a central opening therein and radially extending recesses 16 in the axially outer surface thereof for mounting and precisely positioning a plurality of circumferentially distributed C-shaped (also referred to as U- or arc-shaped) armature elements 26.

The disc shaped portion contains a chamfer 84 at the central opening.

Referring again to FIG. 1, each armature core element 26 is preferably provided with an individual AC armature coil 24 coiled about and supported by a longitudinally extending base portion of the C-shaped armature element 26. Armature elements 26 are made of a magnetic material while the end portions 14 are composed of a non-magnetic material such as aluminum or a phenolic. Field windings 22 are supported by the generally cylindrical portion 12 of spool-like support structure 11. The field windings 22 are in close proximity with the armature coils 24. Both the field windings 22 and the circumferentially spaced armature coils 24 are coaxial with the longitudinal axis 6.

During operation, if a DC current is applied to the field windings 22, and the rotor is mechanically rotated, energy will be produced in the armature windings 24 and the machine will function as a generator. If the armature windings 24 are supplied with an AC current in a manner to produce a rotating magnetic flux wave between the legs 34 of the C-core armature elements and the poles of the rotor 40 at the rotor lobe surfaces 44, the rotor will rotate as a motor. A more detailed description of dynamoelectric machines, their construction and operation is disclosed in U.S. Pat. Nos. 4,786,834 and 4,864,176.

Various stator assemblies and support structures may be used to support and position C-shaped armature elements about a rotor for use as a dynamoelectric machine. Both U.S. Pat. Nos. 4,786,834 and 4,864,176, each incorporated herein by reference, disclose dynamoelectric machines containing various stator support assemblies and structures. The support and positioning structure in accordance with the principles of the present invention may be useable in any of these stator assemblies. However, the invention is not limited to application or use in any one of these assemblies.

Referring again to FIG. 1, in accordance with the principles of the present invention, the stator assembly 4 includes a pair of nonmagnetic ring shaped members 9. Each ring shaped member 9 is located at the axial outer portion of the stator assembly 4 between the frame 90 and the leg 34 of the C-shaped armature elements 26. The ring shaped members 9 are preferably made of a thermally conductive material such as aluminum or copper, and function to support the stator assembly 4, position the C-shaped armature elements, reduce air gap tolerances and facilitate heat transfer from the C-shaped armature element to the housing 90. Although these dynamoelectric machines frequently contain a cooling fluid within the chamber containing the rotor 40, the ring shaped member 9 will provide supplemental cooling which will help increase the machine's performance and efficiency.

Figure 3A:
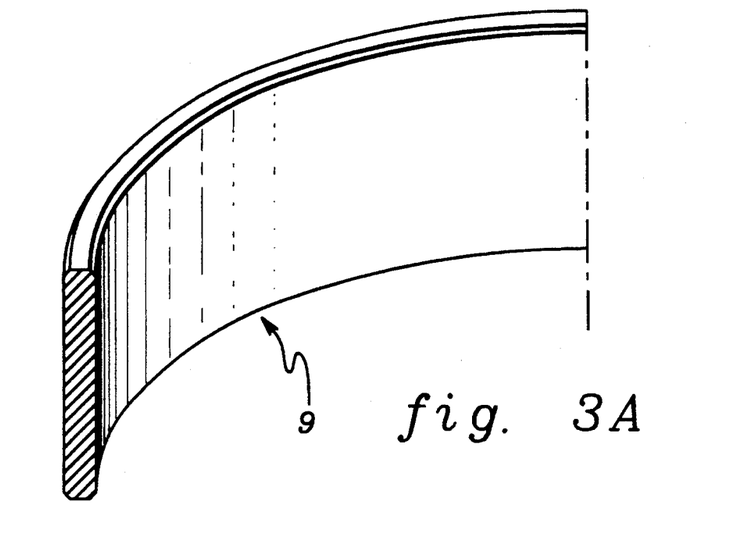
FIGS. 3A-3C depict the ring shaped member used as a support and positioning structure within the stator support assembly of the dynamoelectric machine depicted in FIG. 1.
Figure 3B:
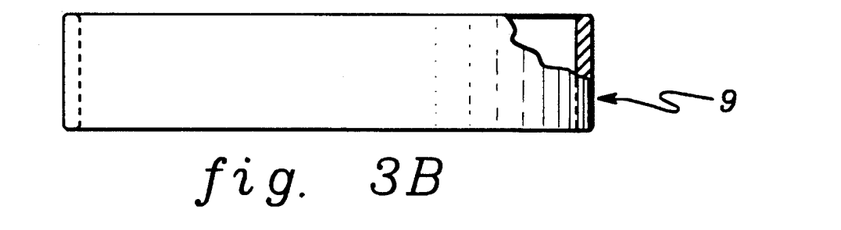
Figure 3C:
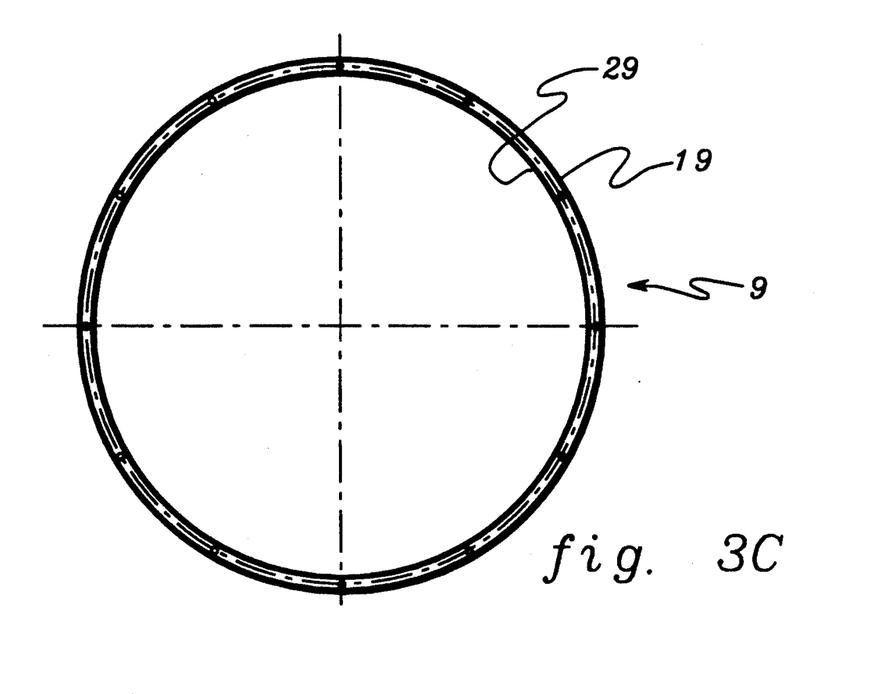
Figure 4:
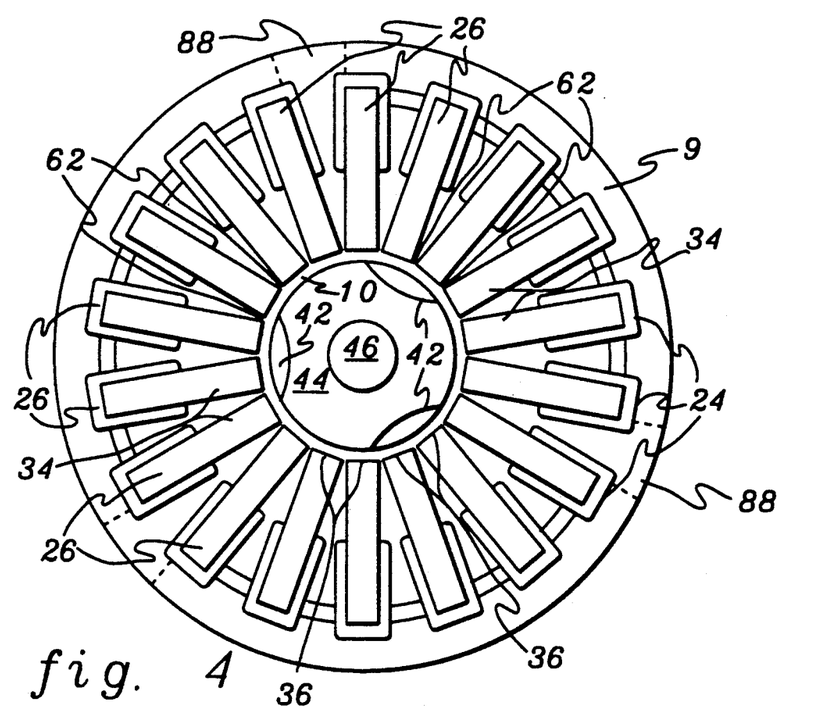
FIG. 4 depicts a view of the stator support assembly of the dynamoelectric machine depicted in FIG. 1 taken along lines 4—4.

As shown in FIG. 1, the ring shaped member 9 contains a substantially uniform outer diameter surface 19 and a substantially uniform inner diameter surface 29. Such a ring shaped member is shown separately in FIGS. 3A-3C. Referring again to FIG. 1, the ring shaped member is sized to be inserted over the C-shaped armature elements such that the inner diameter surface 29 contacts the armature elements 26 and the outer diameter surface 19 contacts the frame 90. Also, the ring shaped members 9 may be press-fit over the C-shaped armature elements 26. As shown in FIG. 4, the plurality of C-shaped armature elements 26 are circumferentially spaced within the ring shaped member 9 such that the legs 34 converge radially towards the rotor 40. Two ring shaped members 9 are used, each located at each axial end, to provide optimum support and improved thermal performance.

The stator assembly is formed by positioning the C-shaped armature elements on the two end portions 14 of the internal spool-like support structure 11. As shown in FIGS. 1 and 4, the C-shaped armature elements are mounted on end portions 14 as part of the stator assembly. End portions 14 contain recesses 16 which are each sized to receive the leg 34 of a C-shaped armature element 26. The end portions 14 are oriented such that the recesses 16 face the nearest end wall 52 of the housing 90. One C-shaped armature element corresponds to a recess on each end portion 14. Therefore, one leg 34 of each armature element is inserted into the corresponding recess 16 of an end portion 14 while the second leg 34 is inserted into the corresponding recess of the opposite end portion. The windings at the base of the armature elements will therefore be located around the periphery of a cylindrically shaped stator assembly.

Referring to FIG. 2, each end portion 14 contains a number of equally spaced radially extending spokes 88 which function to center the stator assembly within the housing 90. The spokes may be affixed to a mounting structure as disclosed in U.S. Pat. No. 5,006,748. Referring again to FIG. 1, the ring shaped members 9 mounted about the stator assembly function as a support and positioning structure for the stator assembly. This configuration helps minimize eddy current losses and armature flux leakage, by allowing closer air gap tolerances within the stator assembly. Moreover, since the ring shaped member is heat conductive, and in contact with the housing 90 and the armature elements 26 of the stator assembly it will improve stator assembly cooling.

Figure 5:
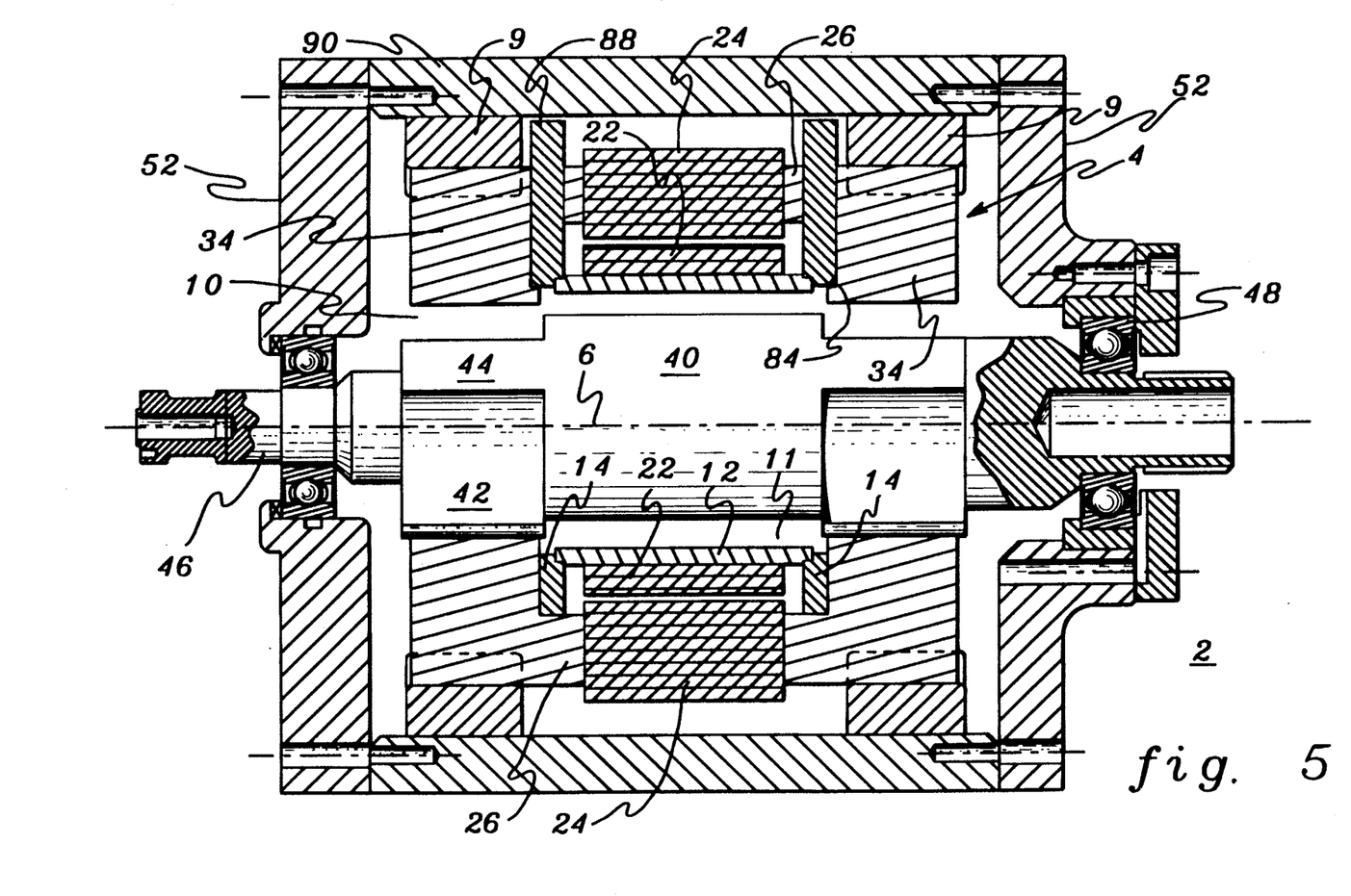
FIG. 5 is a cross sectional view from the side of an inductor type dynamoelectric machine having a stator assembly incorporating an alternative embodiment of a ring shaped support and positioning member in accordance with the principles of the present invention.
Figure 6A:
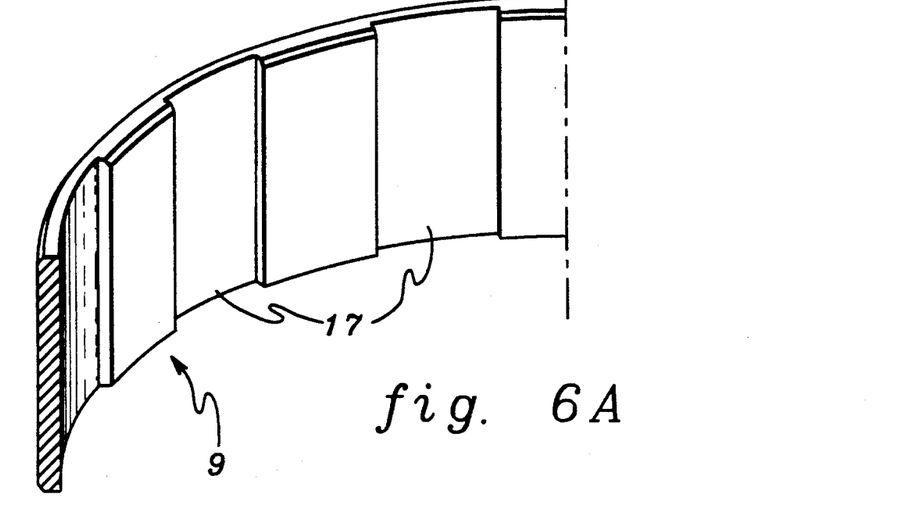
FIGS. 6A-6C depict the alternative ring shaped member depicted in the inductor type dynamoelectric machine shown in FIG. 5.
Figure 6B:
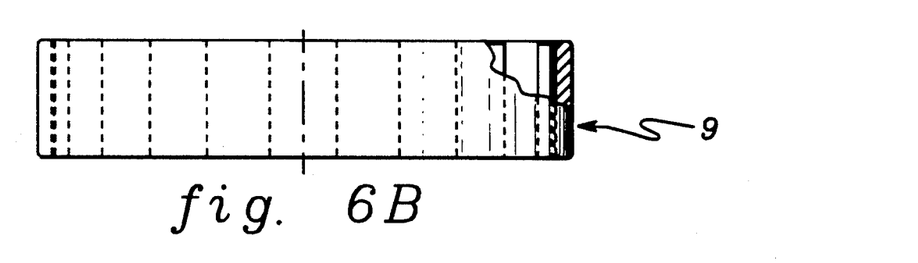
Figure 6C:
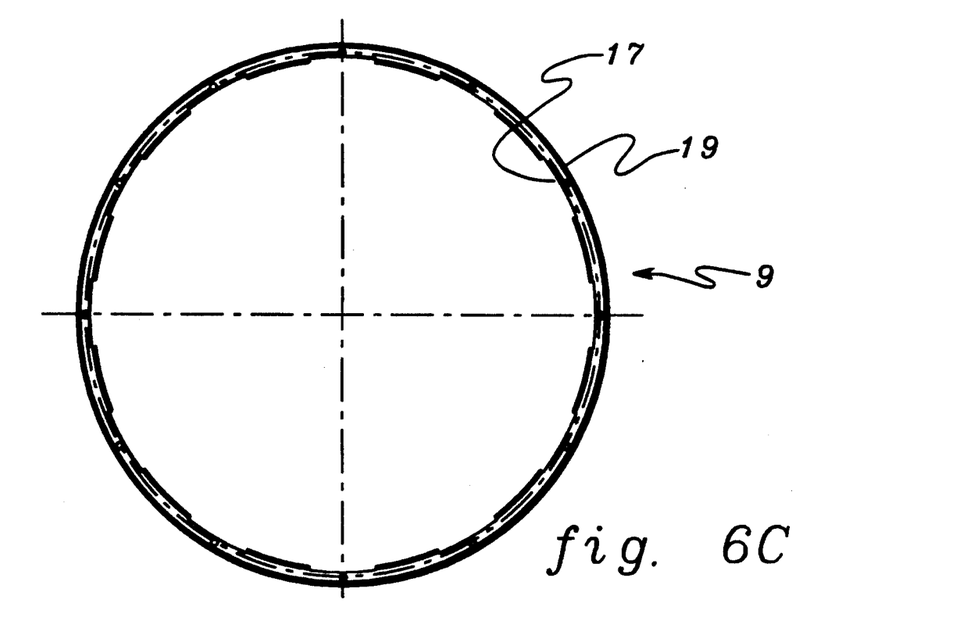

Referring now to FIG. 6, an alternate embodiment of the ring shaped member 9 contains recesses 17 along the inner diameter surface thereof. Each recess 17 may be sized to receive the base of a C-shaped armature element 26 enabling each of the armature elements 26 to slide into a corresponding recess 17. This design provides for increased contact area between the ring shaped member 9 and the armature elements 26 to improve heat conduction therebetween. Moreover, the recesses 17 provide additional stability for the C-shaped armature elements. FIG. 5 illustrates the position of the recessed ring shaped member 9 depicted in FIG. 6, as well as the C-shaped armature elements 26, within a stator assembly.

Figures 7A, 7B:
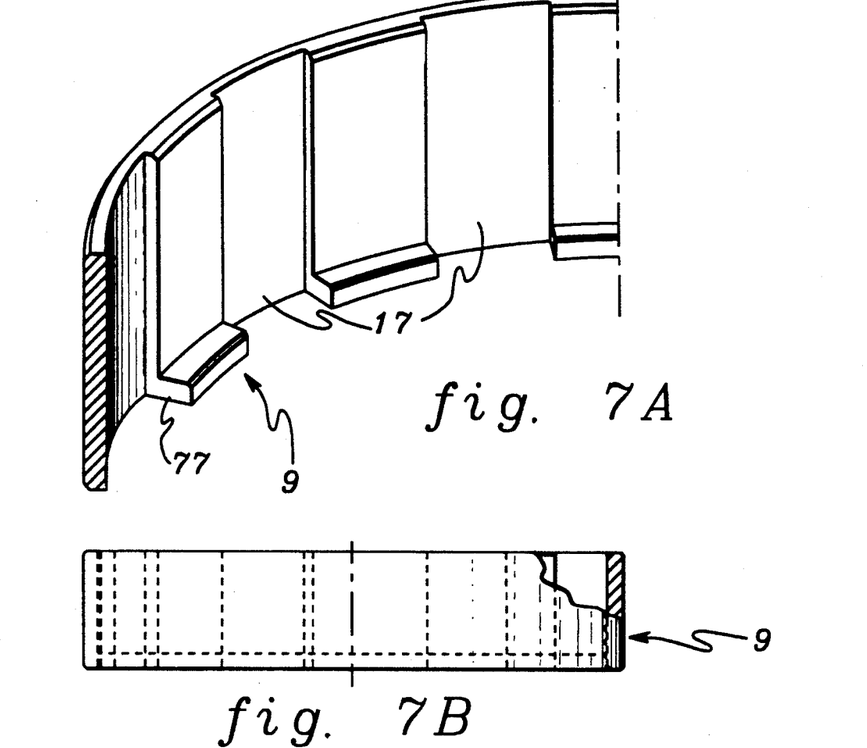
FIGS. 7A-7C depict yet another alternative embodiment of a ring shaped member useable in the stator support assembly of the dynamoelectric machine depicted in FIGS. 1 and 5.
Figure 7C:
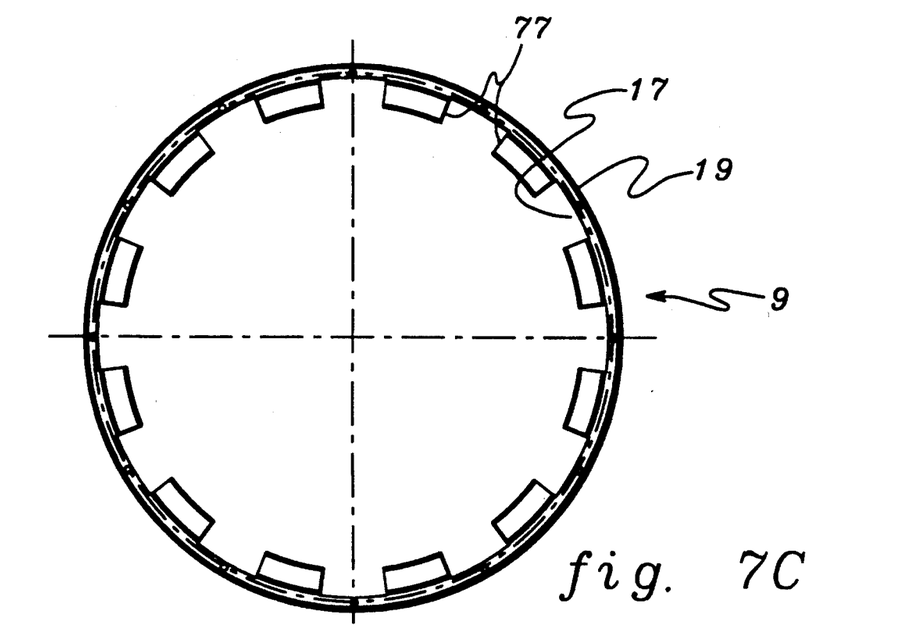

In order to further increase the thermal conductive effect of the ring shaped member 9 the area of contact between the ring shaped member 9, the housing 90 and the C-shaped armature elements 26 may be increased. As shown in FIGS. 7A-7C, the cross-sectional area of the ring shaped member 9 may be L-shaped at circumferential locations not having recesses 17. The L-shaped cross-sectional configuration provides increased contact area between the C-shaped armature element and the ring shaped member 9 maintaining the structural stability of the C-shaped elements within the end portion 14. The L-shaped cross section includes a short leg portion and a long leg portion. The short leg portion of the cross section is radially oriented relative to the longitudinal axis while the long leg portion is axially oriented thereby forming an L-shape. Side surfaces 77, formed by the short leg section of the L-shaped cross section, contact the leg 34 of the C-shaped armature elements 26. The ring shaped member 9 may be sized to be press fit over the circumferentially oriented C-shaped armature elements.

Figure 8A:
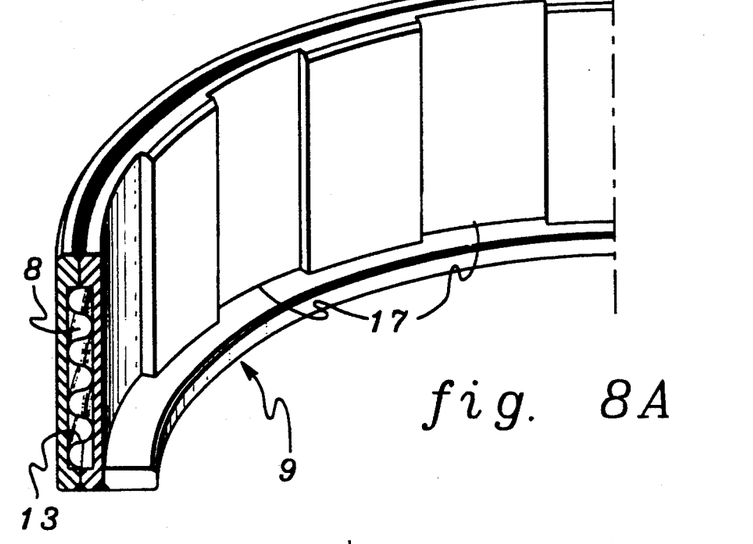
FIGS. 8A-8C depict yet another alternative embodiment of a ring shaped member useable as a support and positioning member for a stator assembly of an inductor type dynamoelectric machine similar to those depicted in FIGS. 1 and 5.
Figure 8B:
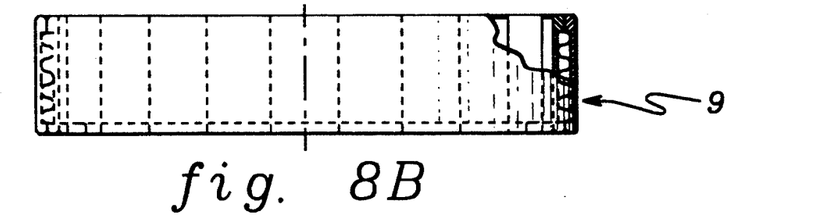
Figure 8C:
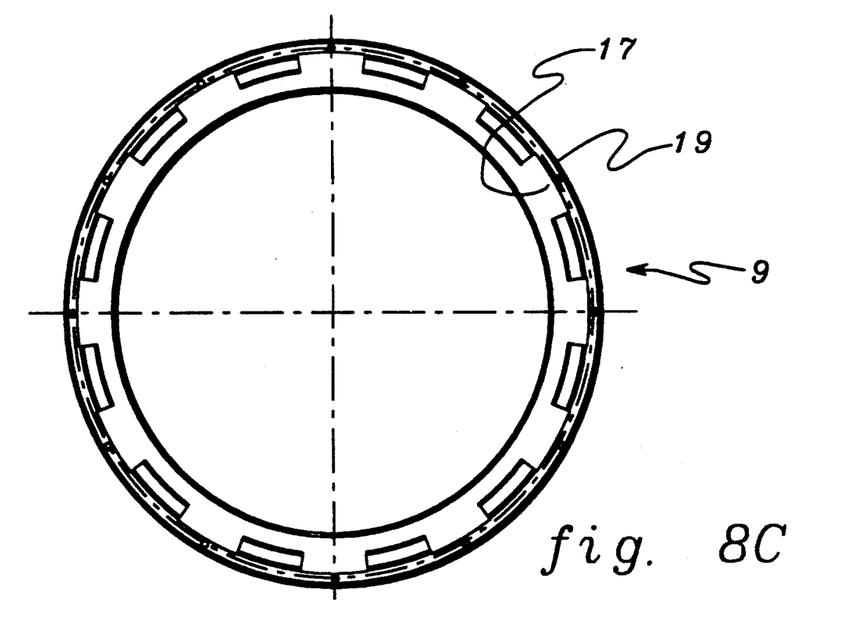

The ring shaped member may also be configured as shown in FIGS. 8A–8C. In this embodiment, the ring shaped member 9 has an L-shaped cross section throughout its circumference and recesses 17. The ring shaped member 9 may also have a passage 8 therein running circumferentially within the central portion of the ring shaped member. The passage may be filled with a heat conductive fluid, such as water, for example. A foil 13 may also be located within the passage 8 to improve the thermal conductive effect of the ring shaped member. Typically, the foil 13 is made of a thermally conductive material such as aluminum or copper. The foil 13 acts as a heat exchanger to transfer heat from the ring shaped member to the circulating fluid therein. Fluid within the passage 8 is pumped therein through an input port (not shown). The fluid circulates through the passage 8 before exiting through an output port (not shown) where it is cooled and recirculated by a pump into the passage. Although, the ring shaped member 9 has an L-shaped cross-section throughout, the passage 8 and foil 13 may be incorporated into ring shaped members of various different cross sections.

Figure 9:
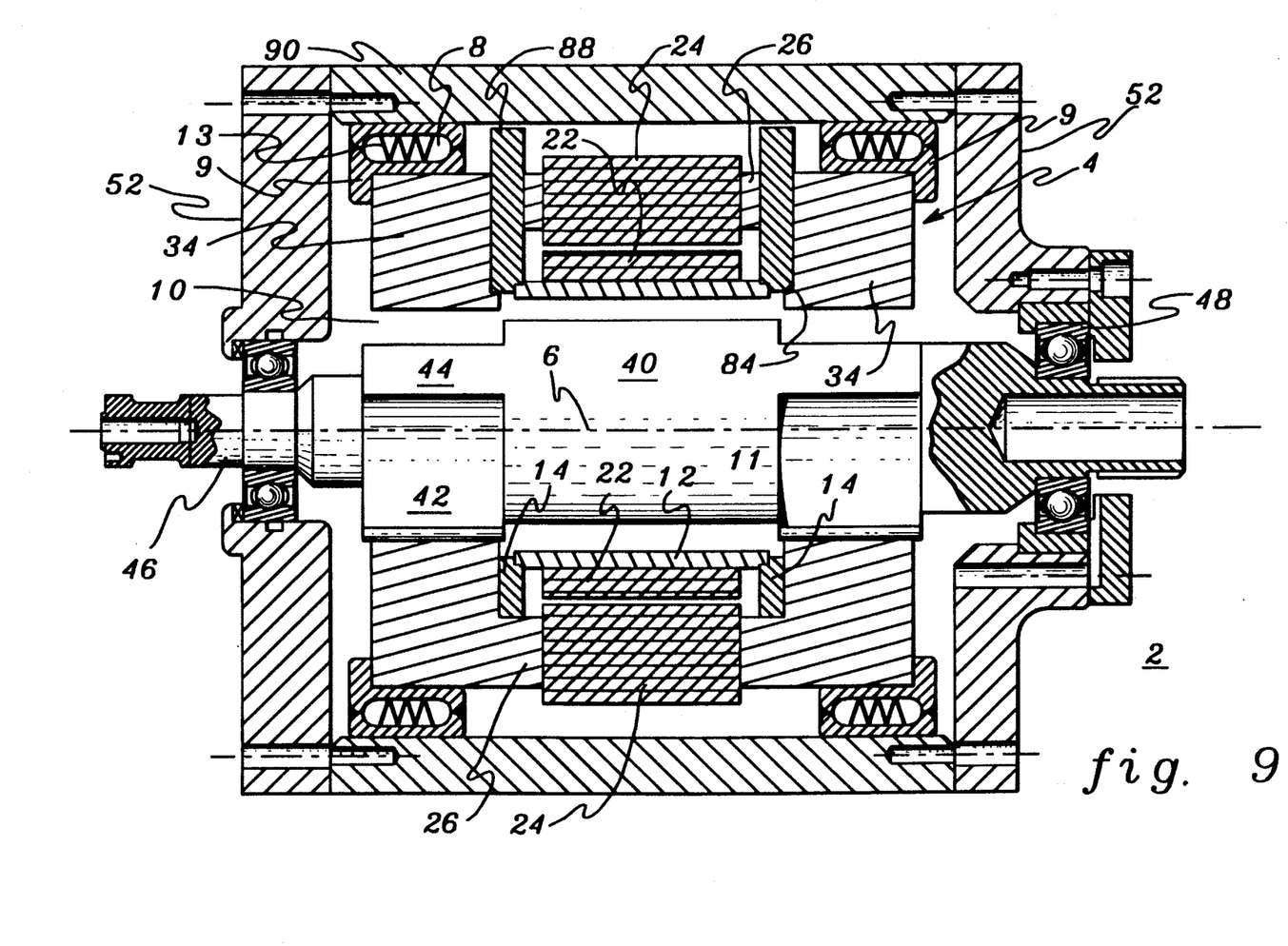
FIG. 9 depicts a cross sectional view from the side of an inductor type dynamoelectric machine having a stator assembly constructed with the ring shaped member depicted in FIGS. 8A-8C in accordance with the principles of the present invention.

FIG. 9 depicts the dynamoelectric machine having the ring shaped member 9 of FIG. 8 installed therein. Two ring shaped members 9 are mounted in position about the circumferentially spaced C-shaped armature elements 26 in a fashion similar to the ring members depicted in FIGS. 1 and 5 and discussed supra. The passage 8 and foil 13 extend circumferentially about the armature elements 26.

Figure 10:
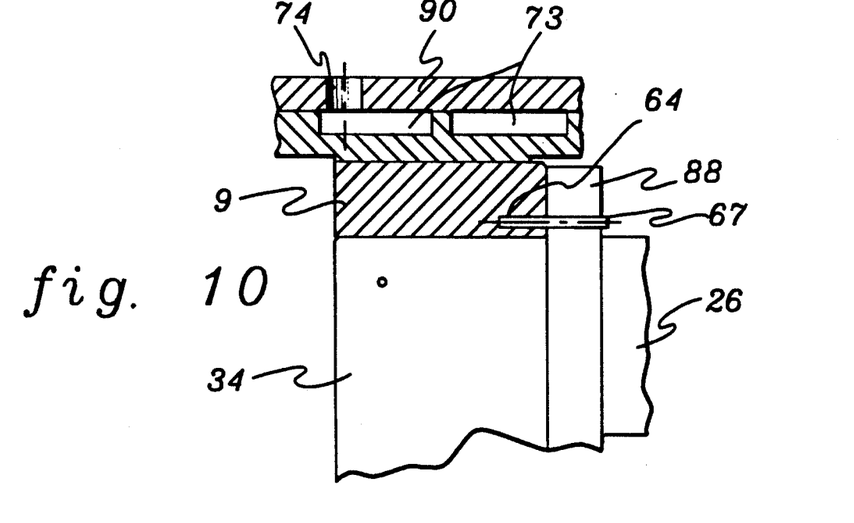
FIG. 10 is an exploded partially broken away cross sectional view of a portion of a stator support structure and housing of an inductor type dynamoelectric machine including a ring shaped member fastened to an end portion in accordance with the principles of the present invention.

Also, as shown in FIG. 10, the spokes 88 of the end portions 14 may be provided with apertures therethrough configured to receive an allen head bolt 67, machine screw or other type fastener therethrough. The bolt 67 may be threaded into a complimentary threaded bore 64 within the ring shaped member 9 such that the ring shaped member may be fastened to the end portions 14 at each of the spokes 88. This technique provides the entire stator assembly with increased structural stability. The housing 90 may contain a plurality of interconnecting passages 73 therethrough for allowing a heat conductive fluid, such as water, to flow therethrough. The fluid may flow into the passages 73 via an input port 74. An output port (not shown) may be located at another portion of the frame to allow the heated fluid to exit therefrom. This configuration allows heat from the stator assembly to be transferred to the ring member 9 and into the frame where it is transferred into the circulating fluid for improved cooling.

Figure 11:
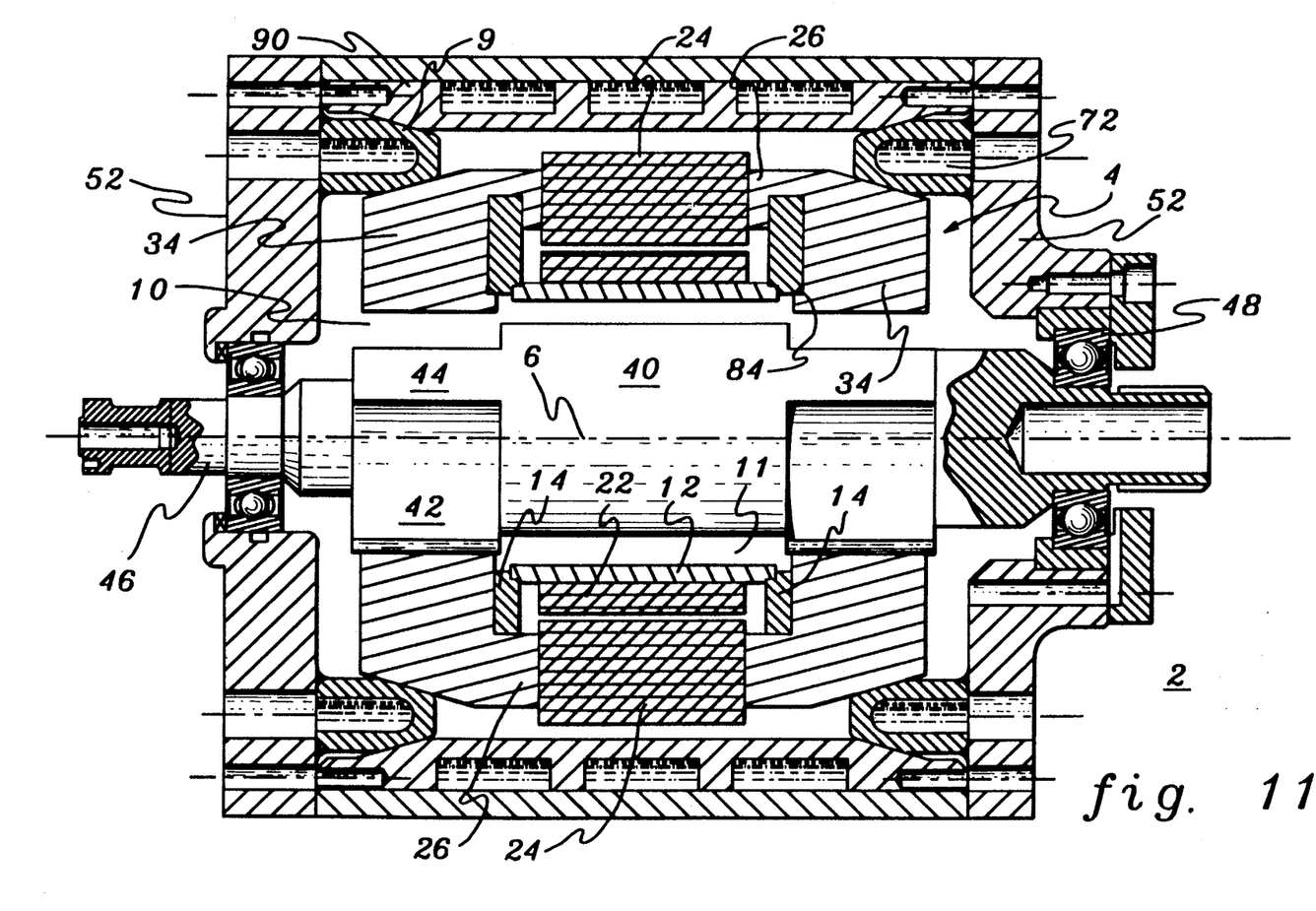
FIG. 11 depicts a cross sectional view from the side of an inductor type dynamoelectric machine incorporating an alternative embodiment of a ring shaped support and positioning member, affixed to the end wall, in accordance with the principles of the present invention.

The support and positioning structure, in accordance with the principles of the present invention, is not limited to the particular cross-sectional configuration previously discussed herein. For example, the cross-sectional configuration may include a taper on the inner and/or outer diameter of the ring shaped support and positioning structure. FIG. 11 discloses a dynamoelectric machine containing a ring shaped support and positioning structure 9 having partially tapered inner and outer diameter surfaces. The C-shaped armature elements 26 are also tapered, at the junction of the legs and base, at an angle which is complimentary to the taper of the inner diameter surface of the ring shaped member. Also, the housing 90 is tapered at the location of contact with the tapered outer diameter surface of the ring shaped member 9. The housing taper is at an angle which is complimentary to the taper of the outer diameter surface of the ring shaped member 9. In this configuration, the ring shaped member 9 may be affixed to the end walls 52 of the housing. Various techniques, such as welding, for example, may be used to affix the ring shaped member 9 to the end wall and the invention is not limited to any particular technique. In this configuration, the ring shaped member acts as a wedge between the housing 90 and the C-shaped armature elements 26 when the end walls are secured to the outer frame. This features enables the stator assembly 4 to be centered by the ring shaped member 9 thereby minimizing air gap tolerances. The ring shaped member may also contain a groove 72 running throughout its circumference. When the ring shaped member 9 is affixed to the end wall 52, the groove 72 functions as a passage to receive a thermally conductive fluid which will facilitate heat transfer from the stator assembly 2 to the housing 90.

Figure 12:
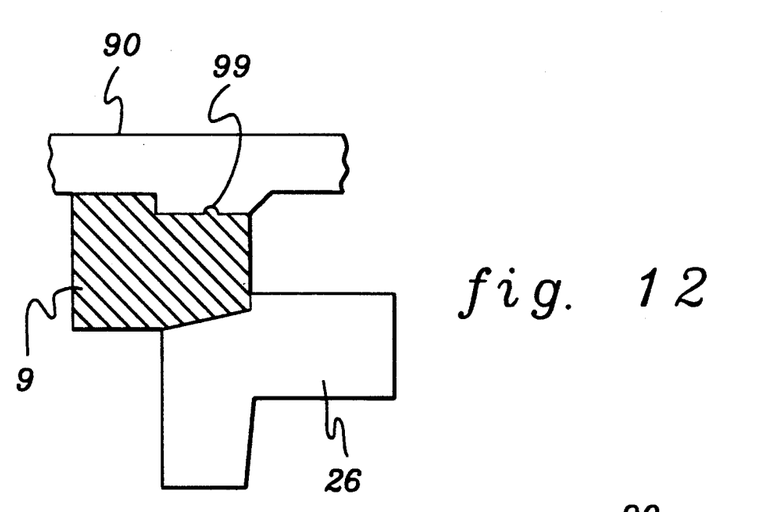
FIG. 12 depicts a broken away, cross sectional view from the side of a portion of a dynamoelectric machine having an alternative embodiment of a ring shaped support member.
Figure 13:
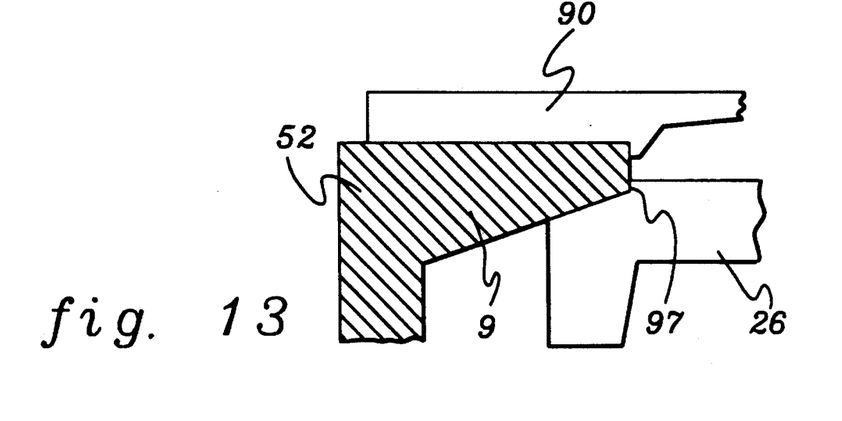
FIG. 13 depicts a broken away, cross sectional view of a portion of a dynamoelectric machine having an embodiment of the ring shaped member which is integrally formed with an end wall.

Other cross-sectional configurations for the ring shaped member 9 may also suffice. For example, FIG. 12 discloses a configuration where the outer frame 90 is shaped to a complimentary fit with the outer diameter surface of the ring shaped member 9. Also, the ring shaped member may contain a protrusion 99 which interlocks with a depression within the housing to ensure a precise fit. As shown in FIG. 13, the ring shaped member 9 may be integrally formed with the end wall 52 thereby alleviating the need for securing the ring shaped member 9 to the end wall 52. Also, the armature element 26 may contain a stop 97 which functions to position the ring shaped member and stator assembly in the proper position.

Other known ways of fastening the support and positioning structure, regardless of its cross-sectional configuration and construction relative to the end wall 52, may be used. For example, various different means for attaching the ring shaped member to the outer frame such as rivets, screws, bolts, glues, epoxy resins, press fit techniques, pressure fits, welds, interlocking notches, as well as others, may also be used. The invention is not limited to any particular fastening technique.

Although the invention has been described in relation to the embodiments depicted herein, it will be apparent to those skilled in the art that various modifications, substitutions and the like may be made without departing from the spirit of the invention. Any such modifications, substitutions or the like are intended to be within the scope of the invention as defined by the following claims.

What is claimed is:

1. A support and positioning structure for a stator assembly of an inductor type dynamoelectric machine wherein the stator assembly includes a plurality of stationary C-shaped armature elements circumferentially spaced about a central longitudinal axis and supported by one or more end portions, each C-shaped armature element including an armature winding on a base and a leg extending from each end of said base in a radially inward direction, said support and positioning structure comprising:

a nonmagnetic thermally conductive ring shaped member sized to be insertable over the bases of the circumferentially spaced C-shaped armature elements wherein said bases are in contact with an inner portion of the ring shaped member to radially position the C-shaped armature elements, and an outer surface of the ring shaped member is in contact with an outer frame of the dynamoelectric machine to transfer heat from the armature elements to said frame.

2. The support and positioning structure of claim 1 wherein the ring shaped member is press fit onto the bases of the circumferentially spaced C-shaped armature elements.

3. The support and positioning structure of claim 1 further comprising a plurality of recesses axially oriented and circumferentially spaced within the ring shaped member, said recesses being sized to receive the base of one of said C-shaped armature elements wherein said bases of the C-shaped armature elements are axially insertable into corresponding recesses within the ring shaped member.

4. The support and positioning structure of claim 3 wherein the ring shaped member comprises an L-shaped cross section having a long leg portion and a short leg portion wherein as the ring shaped member is placed on the C-shaped armature elements the long leg is axially oriented and the short leg protrudes radially inward relative to the longitudinal axis.

5. The support and positioning structure of claim 2, 3 or 4 wherein an outer diameter surface of the ring shaped member is in heat conducting contacting relationship with the outer frame of the dynamoelectric machine.

6. The support and positioning structure of claim 5 further comprising a passage running circumferentially within the ring shaped member, said passage being capable of receiving a heat conductive fluid therein.

7. The support and positioning structure of claim 6 wherein the ring shaped member having a passage running circumferentially therein further comprises a foil located within said passage.

8. The support and positioning structure of claim 1 wherein the ring shaped member is in contact with one of said end portions.

9. The support and positioning structure of claim 8 further comprising means for fastening said ring shaped member to said one of said end portions.

10. The support and positioning structure of claim 1 wherein the ring shaped member is integral to an end wall of an outer frame of the dynamoelectric machine.

11. The support and positioning structure of claim 10 wherein the ring shaped member has a tapered inner diameter surface, said tapered surface being complimentary to a taper of the C-shaped armature elements.

12. The support and positioning structure of claim 10 wherein the ring shaped member has a tapered outer diameter surface, said tapered outer diameter surface being complimentary to a taper of the outer frame.

13. A stator assembly of an inductor type dynamoelectric machine comprising:
a plurality of stationary C-shaped armature elements circumferentially spaced about a central longitudinal axis, said armature elements including an armature winding on a base and a leg extending from each end of the base;
one or more end portions supporting the C-shaped armature elements such that the legs of the C-shaped armature elements extend in a radially inward direction;
a nonmagnetic thermally conductive ring shaped member sized to be insertable over the bases of the circumferentially spaced C-shaped armature elements wherein said bases are in contact with an inner portion of the ring shaped member to radially position the C-shaped armature elements, and an outer surface of the ring shaped member is in contact with an outer frame of the dynamoelectric machine to transfer heat from the armature elements to said frame.

14. The stator assembly of claim 13 further comprising a second nonmagnetic ring shaped member sized to be insertable over the bases of the circumferentially spaced C-shaped armature elements wherein said bases are in contact with an inner portion of the second ring shaped member and an outer surface of the second ring shaped member is in contact with the outer frame, each of said ring shaped members being spaced on opposite ends of the bases of the circumferentially spaced C-shaped armature elements.

15. The stator assembly of claim 14 herein at least one of said ring shaped members is press fit onto the bases of the circumferentially spaced C-shaped armature elements.

16. The stator assembly of claim 15 further comprising a plurality of recesses axially oriented and circumferentially spaced within at least one of the ring shaped members, said recesses being sized to receive the base of one of said C-shaped armature elements wherein said bases of the C-shaped armature elements are axially insertable into corresponding recesses within the ring shaped member.

17. The stator assembly of claim 16 wherein at least one of the ring shaped members comprises an L-shaped cross section having a long leg portion and a short leg portion wherein as the ring shaped member is placed on the C-shaped armature elements the long leg is axially oriented and the short leg protrudes radially inward relative to the longitudinal axis.

18. The stator assembly of claim 15, 16 or 17 wherein an outer diameter surface of at least one of the ring shaped members is in heat conducting contacting relationship with the outer frame of the dynamoelectric machine.

19. The stator assembly of claim 14 further comprising a passage running circumferentially within at least one of the ring shaped members, said passage being capable of receiving a heat conductive fluid therein.

20. The stator assembly of claim 19 wherein at least one of the ring shaped members having a passage running circumferentially therein further comprises a foil located within said passage.

21. The stator assembly of claim 14 wherein at least one of the ring shaped members is in contact with one of said end portions.

22. The stator assembly of claim 21 further comprising means for fastening at least one of the ring shaped members to said one of said end portions.

23. The stator assembly of claim 13 wherein the ring shaped member is integral to an end wall of a housing of the dynamoelectric machine.

24. The stator assembly of claim 23 wherein the ring shaped member has a tapered inner diameter surface, said tapered inner diameter surface being complimentary to a taper of the C-shaped armature elements.

25. The stator assembly structure of claim 24 wherein the ring shaped member has a tapered outer diameter surface, said tapered outer diameter surface being complimentary to a taper of the housing.

* * * * *